US008869511B2

(12) United States Patent
Christensen

(10) Patent No.: US 8,869,511 B2
(45) Date of Patent: Oct. 28, 2014

(54) EXHAUST VALVE FOR A LARGE SIZED TWO STROKE DIESEL ENGINE, PROCESS FOR REDUCTION ON $NO_x$-FORMATION IN SUCH AN ENGINE AND SUCH ENGINE

(75) Inventor: Mads Lytje Christensen, Allerød (DK)

(73) Assignee: Man Diesel & Turbo, Filial AF Man Diesel & Turbo SE, Tyskland, Copenhagen (DK)

( * ) Notice: Subject to any disclaimer, the term of this patent is extended or adjusted under 35 U.S.C. 154(b) by 331 days.

(21) Appl. No.: 12/736,797

(22) PCT Filed: May 12, 2009

(86) PCT No.: PCT/DK2009/000109
§ 371 (c)(1), (2), (4) Date: Nov. 10, 2010

(87) PCT Pub. No.: WO2009/138085
PCT Pub. Date: Nov. 19, 2009

(65) Prior Publication Data
US 2011/0061365 A1    Mar. 17, 2011

(30) Foreign Application Priority Data

May 13, 2008  (DK) ................................. 2008 00674

(51) Int. Cl.
| | |
|---|---|
| F01N 3/00 | (2006.01) |
| B21K 1/22 | (2006.01) |
| F01L 3/00 | (2006.01) |
| F01L 3/02 | (2006.01) |
| F02B 47/08 | (2006.01) |
| F02M 25/07 | (2006.01) |
| F01L 3/06 | (2006.01) |
| F02B 23/06 | (2006.01) |

(52) U.S. Cl.
CPC .................. *F02L 3/20* (2013.01); *Y02T 10/125* (2013.01); *F02B 23/0675* (2013.01); *Y02T 10/146* (2013.01); *F02B 23/0624* (2013.01); *F02B 23/0663* (2013.01); *F01L 3/06* (2013.01); *F02B 23/0648* (2013.01); *F01L 2820/01* (2013.01)
USPC .... 60/274; 29/888.42; 123/188.2; 123/188.3; 123/568.14

(58) Field of Classification Search
USPC .............. 60/274, 314, 324; 29/888.4, 888.42; 123/188.2, 188.3, 188.4, 190.14, 301, 123/568.14
See application file for complete search history.

(56) References Cited

U.S. PATENT DOCUMENTS

| | | | | |
|---|---|---|---|---|
| 2,882,886 | A |   | 4/1959 | Butcher ...................... 123/188.3 |
| 3,156,223 | A | * | 11/1964 | Blomquist .................... 123/264 |

(Continued)

FOREIGN PATENT DOCUMENTS

| | | |
|---|---|---|
| CN | 101070765 | 11/2007 |
| DE | 2001626 | 9/1971 |

(Continued)

*Primary Examiner* — Audrey K Bradley
(74) *Attorney, Agent, or Firm* — Bacon & Thomas, PLLC

(57) ABSTRACT

For reducing the $NO_x$-emission of a large sized two stroke diesel engine having at least one combustion room (3), a reciprocating piston (4) and an exhaust opening (12) controlled by an exhaust valve (13) at each work cyclus a small volume of burnt gas is retained in the combustion room (3) and so added to the fresh air for the next combustion. For achieving this retention of burnt gas the underside of the valve disc (15) off the exhaust valve (13) is provided with a shallow concave face (17) building a basin-like collection room, whose depth is within a range of 2-10% of the outer diameter of the valve disc (15).

15 Claims, 3 Drawing Sheets

(56) References Cited

U.S. PATENT DOCUMENTS

| | | | |
|---|---|---|---|
| 4,815,706 A * | 3/1989 | Feuling | 251/356 |
| 6,173,702 B1 * | 1/2001 | Hoeg | 123/668 |
| 2002/0073704 A1 | 6/2002 | DiMarco | 60/599 |
| 2003/0226537 A1 | 12/2003 | Schaich | 123/188.2 |
| 2005/0257618 A1 * | 11/2005 | Boken | 73/587 |
| 2008/0149062 A1 * | 6/2008 | Luepfert | 123/188.3 |

FOREIGN PATENT DOCUMENTS

| | | | |
|---|---|---|---|
| DE | 3827154 | 2/1990 | |
| DE | 10116643 | 10/2002 | |
| DE | 10249941 | 5/2004 | |
| DE | 102005013088 | 9/2006 | |
| EP | 0049396 | 4/1982 | |
| EP | 0657629 | 6/1995 | |
| GB | 129015 | 7/1919 | |
| GB | 262921 | 12/1926 | |
| GB | 368216 | 3/1932 | |
| GB | 375121 | 6/1932 | |
| GB | 437003 | 10/1935 | |
| GB | 2227055 | 7/1990 | |
| JP | 58041212 | 3/1983 | |
| JP | 60067707 | 4/1985 | |
| JP | 61-197731 | 9/1986 | |
| JP | 7139322 | 5/1995 | |
| JP | 7-145710 | 6/1995 | |
| JP | 2000-320335 | 11/2000 | |
| JP | 6-277876 | 8/2001 | |
| JP | 2001-221051 | 8/2001 | |
| WO | WO 2006/097264 A1 * | 9/2006 | F01L 1/32 |

\* cited by examiner

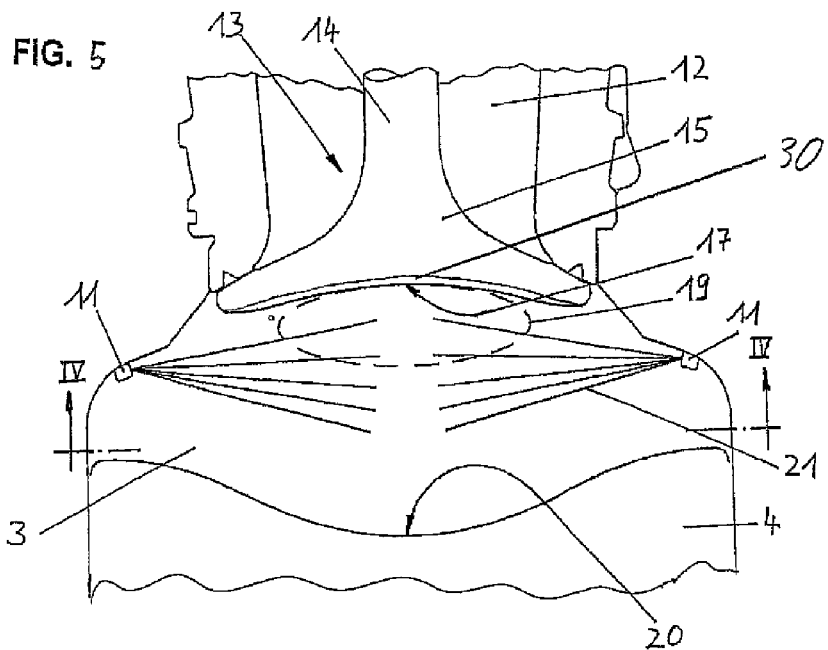
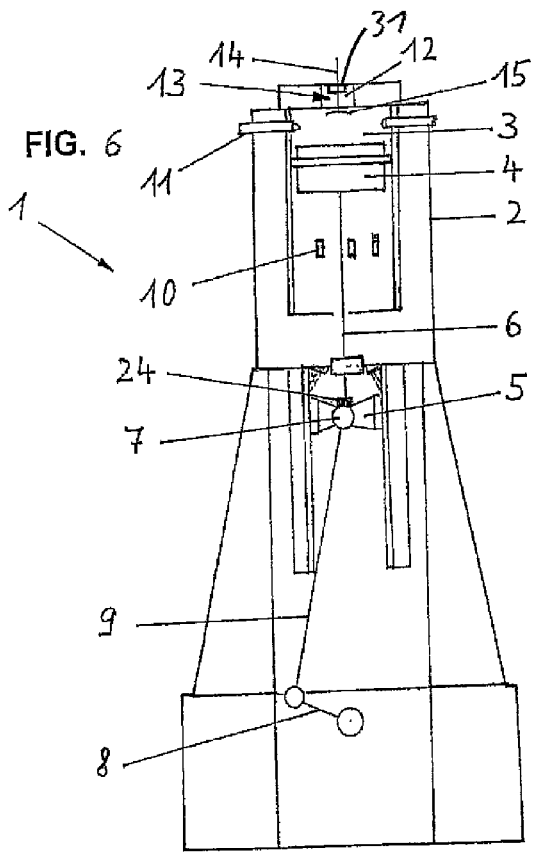

ature and herewith the generation of $NO_x$ can be
EXHAUST VALVE FOR A LARGE SIZED TWO STROKE DIESEL ENGINE, PROCESS FOR REDUCTION ON $NO_x$-FORMATION IN SUCH AN ENGINE AND SUCH ENGINE The invention relates according to a first idea to an exhaust valve for a large sized two stroke diesel engine, according to a further idea to a process for reduction of $NO_x$-formation in such a large sized two stroke diesel engine, and according a still further idea to such a large sized two stroke diesel engine. Also manufacturing methods as well as use of an inventive exhaust valve as well as of such an engine are scoped.

It is generally known in the art that peaks of combustion temperature and herewith the generation of $NO_x$ can be reduced when some burnt gas is added to the new air filling of the combustion room. For this purpose it has been proposed already to recirculate a part of the exhaust gas (DE 101 16 643 C2). But there is a risk that not only exhaust gas but also scavenge air reaches the exhaust channel so that the exhaust gas is diluted with scavenge air that leads to a higher oxygen content of the recirculated exhaust gas and therefor to a higher $NO_x$-formation. Further substantial disadvantages herewith are that an expensive and complex recirculation device is needed, and that such device is occupying hardly available space near the engine.

The GB 222 7055 A describes a two stroke diesel engine with an exhaust opening controlled by an exhaust valve. The underside of this exhaust valve is concave and makes a symmetric cavity bordered by the rim. The reason for this is here that the fuel supply tube and injection nozzle are integrated in the exhaust valve. Conserving some burnt gas in the manner of a nest within the rim area of the concave underside of the exhaust valve for reduction of $NO_x$-formation isn't mentioned. The same is true also for the dimension of the cavity on the underside of the exhaust valve.

Starting from this prior art it is an object of the invention to create an improved exhaust valve suitable for reduction of $NO_x$-formation as well as to create an improved method for manufacturing it.

A second object of the invention is to create an improved process for reduction of $NO_x$-formation.

Further objects of the invention are to design an improved large sized two stroke diesel engine as well as to create an improved method for manufacturing or remanufacturing it.

The first object is solved by providing an exhaust valve, or a method of manufacturing an exhaust valve, for controlling an exhaust opening of a large sized diesel engine of the two stroke type, the exhaust valve having a valve disc arranged at the lower end of a valve shaft, in which the valve disc's underside that faces a combustion room is provided with a basin designed as a rotationally symmetric cavity surroundingly bordered and being downwardly open, and in which, for retention of burnt gas, the maximum rise of a concavely shaped underside of the valve disc relative to an imaginary planar face directly supporting the valve disc is within the range of 2-10% of the outer diameter of the valve disc.

The second object is solved by a process for reduction of $NO_x$-formation in a large sized diesel engine with an exhaust opening coaxially arranged within and controlled by an exhaust valve of the type described above, in which fuel injection, combustion of fuel, ejection of burnt gas, scavenging and filling with fresh air as well as compression of the filling of the combustion room are carried out in the combustion room at each work cycle, in which some burnt gas is added to the air before combustion, and in which at least some of the burnt gas added to the air is conserved in the combustion room in the manner of a nest of burnt gas built within the rim area of the concavely shaped underside of the exhaust valve.

The further objects are solved by providing a diesel engine having an exhaust valve of the type described above.

By the superposed teaching it is achieved, that the right amount of burnt gas to add to the air for the next combustion is conserved in the combustion room in the manner of a nest of exhaust gas built within the rim area of the underside of an exhaust valve controlling an exhaust opening arranged coaxially with the combustion room. The burnt gas retained in the combustion room is not diluted with fresh air so that the content of oxygen is very low. Therefor just a minor volume of retained gas is enough for an effective reduction on $NO_x$-emission as well as for a favorable temperature distribution in the exhaust valve material. Furthermore, the mass of the exhaust valve and therefor also the heat transfer to the gas within this combustion room is reduced.

Useful developments and advantageous embodiments of the superposed ideas as well as manufacturing methods thereof are mentioned in the subclaims.

In the following one working example of the invention shown in the drawing is described.

In the drawing,

FIG. 5 shows an arrangement as in FIG. 3 with a modified exhaust valve.

FIG. 6 shows a diesel engine that is slightly modified with respect to the diesel engine of FIG. 1.

Figure 1:
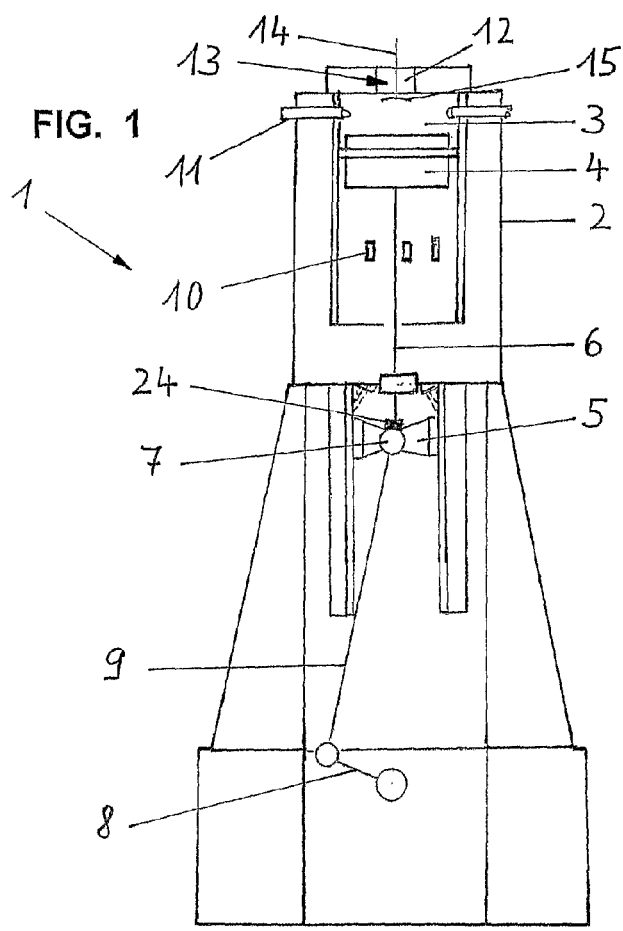
FIG. 1 shows a schematic vertical section through a large sized two stroke diesel engine of inventive type.

Diesel engines of the type as shown in FIG. 1 normally are used for ship propulsion or for driving big stationary power plants. Everywhere in this description and in the related claims directional terms like up, down, side, etc. are referring to the principal relative positions of the piston, cylinder, combustion room, and exhaust valve as shown in FIG. 1 of a standing engine with vertical cylinder axis. Other orientation directional terms are to be interpreted accordingly.

The diesel engine 1 shown in FIG. 1 is a large sized two stroke diesel engine of the crosshead type. For one such engine normally more cylinders are provided often as a single-row I-arrangement although other arrangements also are known, e.g. V-, X-, Y-arrangements. One of these cylinders 2 can be seen in the section view of FIG. 1. Each cylinder 2 contains a combustion room 3 which downwards is delimited by a reciprocating piston (assembly) 4 by means of which the volume of the combustion room can be increased/decreased.

The piston assembly 4 is connected with a crosshead assembly 5 via a piston rod 6. The crosshead assembly 5 comprises a swingable bearing construction of a known type, here shortly called crosshead pin 7. The piston rod 6 is fastened to the piston assembly and to the crosshead assembly 5. The crosshead assembly 5 is connected to a crankshaft 8 by means of a connecting rod 9 which has one end swingably connected at the crosshead pin 7 and has another end rotatably connected to a crankshaft pin as known in the art.

The cylinder 2 is provided in its lower area with air inlet slots 10. The air inlet slots 10 are opened and closed relative to the combustion chamber by the reciprocating piston 4. Through the air inlet slots 10 when opened, air can be fed into the combustion room 3 for its scavenging and filling. Throughout this description and the related claims, in this regard, the expression "air" is to be understood as meaning not only pure ambient air, but also air possibly having other gassy component(s) mixed-in to e.g. control the overall oxygen content of "air" fed into the combustion chamber. In the upper area of the cylinder 2 fuel injection valve(s) is/are positioned for injection of fuel into the combustion room 3 when the piston 4 is in the region of its top dead center.

Burning of the injected fuel causes a downward movement of the piston 4. After that, the burnt gas is exhausted through an exhaust opening 12 positioned at the upper end of the combustion room 3, preferably coaxially. This exhausted burnt gas normally is called exhaust gas. The exhaust opening 12 is controlled by an assigned exhaust valve 13. The exhaust valve 13 can be designed as a built valve or as a one piece valve. The exhaust valve can be manufactured according to various methods whereof some are scoped by claims. For example, it can be beneficial to use manufacturing methods that use new, possibly surplus valves or valve parts, or that re-use parts or areas of worn valves of compatible design. Thus manufacture/reconditioning of an inventive exhaust valve is made more economical and environmental friendly by reuse of both previous results of costly processing efforts and of material, then simultaneously both leaving less waste material and requiring less virgin material. In each case an inventive exhaust valve has a valve shaft 14 and a valve disc 15 arranged at the lower end of the valve shaft 14. In connection with large sized two stroke diesel engine 5 the diameter of the valve disc 15 should be 100 mm at least. Also bigger diameters of for example 160-200 mm or even larger would be possible. In the region of the lower end of the valve shaft 14 above the valve disc 15, propeller blades 16 can be provided for rotating the exhaust valve 13 by the passing exhaust gas as is only indicated in FIG. 2, where propeller blade are shown without their normal "twist". Alternatively, FIG. 5 shows a valve being in large parts identical to the valve shown in FIG. 3, the only difference being that the valve shown in FIG. 5 has an additional protection layer 30 on the underside of the valve disc. In addition, FIG. 6 shows a two stroke diesel engine being in large part identical to the diesel engine shown in FIG. 1, the only difference being that the valve 13 of the diesel engine shown in FIG. 6 has a tag 31 located at the upper side of the valve 13, which can be read out by non-contacting means.

One 360° revolution of the crankshaft 8 wherein one full ascent and full descent of the piston 4 is completed defines one work cycle. During each work cycle a compression of the filling of the combustion room 3, an injection of fuel, a burning of the injected fuel and the air filling of the combustion room 3, an opening of the exhaust valve 13 and exhausting of burnt gas (socalled exhaust gas) as well as an opening and closing of the air inlet slots 10 are carried out, whereby the combustion room 3 is scavenged and filled with new air. The air inlet slots 10 might be so inclined, that the air fed into the combustion room 3 is rotated around a central axis of the combustion room 3.

During the scavenging of the combustion room 3 some of the burnt gas is retained in the combustion room 3. This burnt gas conserved in the combustion room 3 has a low oxygen content which causes reduction of the peak combustion temperature and therefor reduction of the level of generated $NO_x$. In this way the $NO_x$-emission of the diesel engine 1 can be reduced. Also the material temperature distribution in the exhaust valve and especially in its valve disc 15 can be improved in this way.

Figure 2:
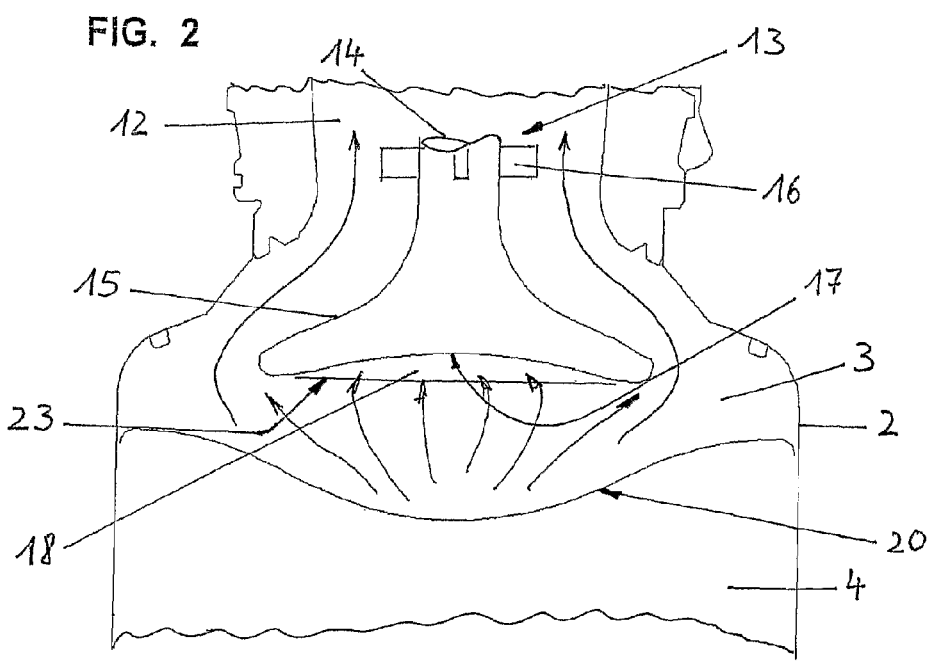
FIG. 2 shows, schematically, the upper area of one cylinder of FIG. 1 with an opened exhaust valve according to the invention.
Figure 3:
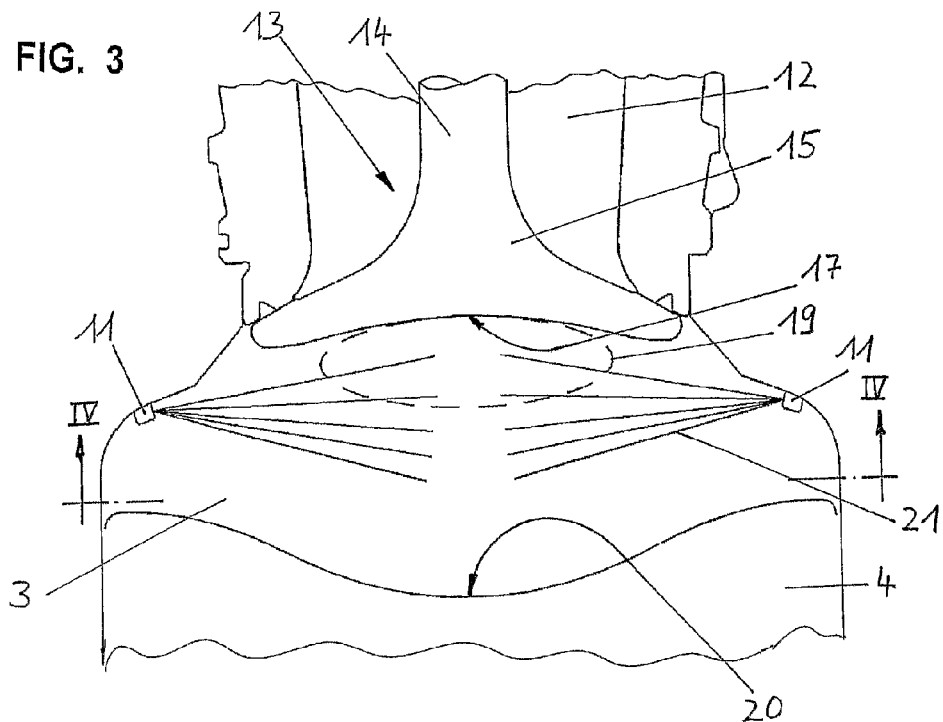
FIG. 3 shows the arrangement of FIG. 2 with closed exhaust valve and FIG. 4 shows a section view along the line IV/IV in FIG. 3.

For this purpose the underside of the valve disc 13 is provided with a shallow rotationally symmetric concave face 17 as can be seen from FIGS. 2 and 3. This rotationally symmetric concave face 17 leads to a cavity 18, surroundingly bordered by the valve disc's rim area and being open towards the combustion room 3.

The function of this cavity 18 is to build a basin-like collection room for retention of burnt gas when the exhaust valve 13 is opened as is schematically shown in FIG. 2. During the compression stroke of the piston 4 the collected and retained burnt gas can build up a nest 19 of burnt gas on the underside of the exhaust valve 13. The upper side of the piston 4 is in this example provided with a rotationally concave face 20 opposite to the concave underside of the exhaust valve 13. This assists the nest formation mentioned above as can be recognized from FIG. 3. Of course a flat piston top surface can be used under some circumstances.

Figure 4:
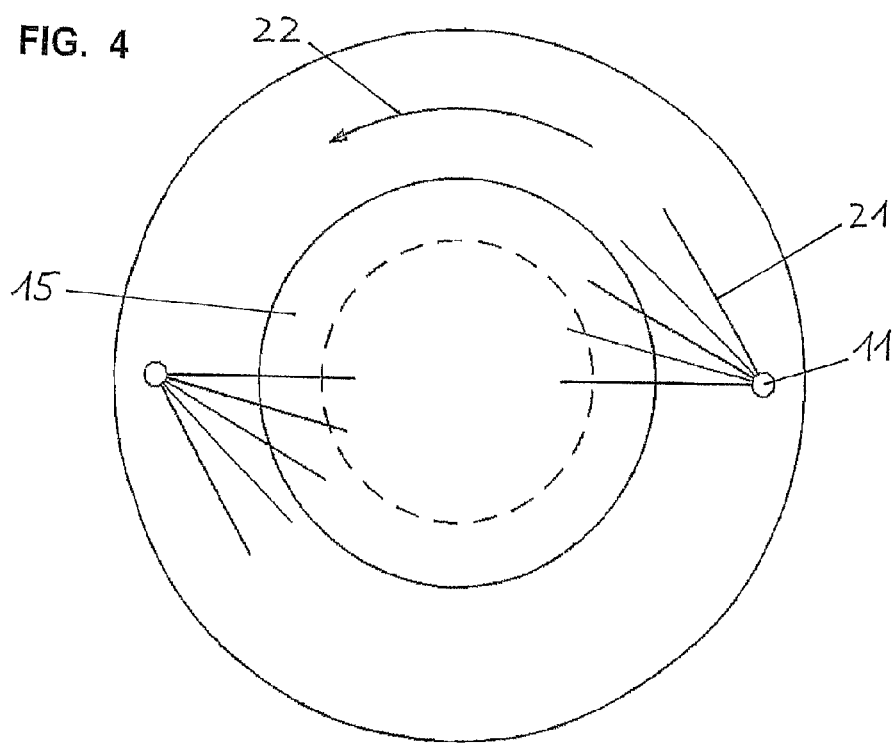

During activation of the fuel injection valves 11 the fuel at least partly is injected in the nest 19 of burnt gas conserved in the combustion room 3 as is indicated by spraying lines 21 in FIGS. 3 and 4. The spray direction is inclined against the radial direction so that most of the fuel is injected into the fresh air rotating according to arrow 22 in FIG. 4 and a small part hits the nest 19 of retained burnt gas. Since this burnt gas has a low oxygen content the combustion is retarded and therefor peaks of combustion temperature and $NO_x$-formation are reduced.

The concave face 17 of the underside of the exhaust valve 13 is so designed that the maximum of the rise relative to an imaginary directly supporting planar face 23, indicated in FIG. 2, is within the range of 2% to 10% of the outer diameter of the valve disc 15, which can be 100 mm-160 mm or bigger as mentioned above. Preferably this range can be 5%-7% and highly preferably 6%-6.5% of the outer diameter of the valve disc 15. This dimensioning of the rise of the concave face 17 results in a sufficient volume of conserved burnt gas. The basin-like cavity 18 can further be so designed that its volume is within the range of 0.5%-3% of the volume of the combustion room 3 in its mostly diminished condition, that is when the piston 4 has reached its top dead center—the exhaust valve 13 of course at the same time being fully raised to seal the combustion room 3 towards the exhaust opening 12. Preferably this range can be 1%-2% and highly preferable 1.6%-1.7% of the said minimum volume of the combustion room 3.

Said volume of the cavity 18 would lead to an enlargement of the total volume of the combustion room 3. For avoiding such enlargement, compensation means are provided. For achieving the wished compensation the top level of the piston 4 can be raised accordingly compared to an arrangement with an uncarved exhaust valve. This can be done by providing the upper face (part) of the piston 4 with a top layer of corresponding thickness. According another possibility, which is to be preferred, a shims layer of corresponding thickness can be inserted between two supporting areas assigned to the piston assembly 4. In the preferred embodiment shown in FIG. 1 a shims layer 24 is shown inserted between mutually supporting areas of the piston rod 6 and of the crosshead pin 7, respectively.

Manufacturing of a large sized two stroke diesel engine scoped by the invention generally is performed by mounting of at least one inventive exhaust valve to any other part or assembly of parts being part of a said engine. The latter method is highly relevant as submounting to major assemblies before final assembling of the engine is very common for this size of engines often used as sole source for propulsion power in a ship. Also mounting of a shims layer between two supporting areas assigned to a piston assembly being delimiting a combustion room also being delimited by an inventive exhaust valve can be comprised in such manufacturing. Preferably during the manufacturing a shims layer is inserted between a present crosshead pin structure and its corresponding piston rod to co-function at same combustion room with an inventive exhaust valve.

In most cases a new large sized two stroke diesel engine is built by the manufacturing, but a used such engine can be brought to a scoped state by retrofitment to an existing large sized two stroke diesel engine of another known type, of at least one inventive exhaust valve to replace a conventional exhaust valve which of course previously was removed from said engine. Preferably inventive exhaust valves then are installed for all the engine's cylinders, so that an engine that would otherwise be subject to operation restrictions for environmental reasons can be "revived", possibly as an original-MAN B&W-brand-"refurbished" engine, to yield many more years of effective service e.g. when installed in a ship then being acceptable to the current IMO-rules. (IMO=International Maritime Organization, a United Nations body issuing maritime regulations, "TIER"s, for emissions upper limits, etc.)

A special type of retrofitment or remanufacturing occurs when at an existing large sized two stroke diesel engine already having inventive exhaust valves mounted, one or more of these exhaust valves are replaced by another inventive exhaust valve having a shape of its valve head being different from the replaced exhaust valve. The purpose of such replacement then is to obtain a better reduction of the $NO_x$-formation. Reasons for switching to another type of fuel for a substantial time period may include: that a new optimization is required for an engine mounted in a ship, and that this ship still can fulfill e.g. IMO-requirements to low emissions to get access to coastal areas and the harbors lying there. Such retrofit also can be relevant when said engine, maybe still with same fuel-type, for a period of time is foreseen to function at a typical power output level deviating more than 15% from a recently used other typical power output level, e.g. because fuel prices demand a reduction in cruising speed by reducing engine power from 90 to 60 of maximum power as an example, often resulting in the sailing speed being reduced by only a few knots reduced. Remanufacturing of an inventive large sized two stroke diesel engine by replacement of a worn exhaust valve with an inventive exhaust valve is another beneficial possibility of manufacture of a such large diesel engine yielding a possibility to revitalize an otherwise worn out engine.

For all such engine manufacturing it is foreseeable to use inventive exhaust valves provided by any mentioned or claimed method of manufacturing of inventive exhaust valves. Common to all such methods is processing an exhaust valve from a specific state. Such processing of course is to be understood in a broad sense and can therefore comprise e.g. milling, turning, grinding, polishing or other material removal methods, but also material combining, adding or compacting methods as welding, depositing methods like sintering, metal spraying, pressing, forging etc. or known combinations thereof, all of which methods are well known to the person skilled in the art.

Further, an inventive exhaust valve embodiment of a given external disc diameter may be manufactured in a number of almost similar variants which are very difficult to effectively distinguish or identify by simple human visual observation of the shape of the cavity in the valve's underside, or by a simple measuring procedure. Thus a pronounced risk has been reported, for faulty selection of a thus unsuited inventive exhaust valve for later being mounted to function in an inventive large sized two stroke diesel engine. Consequently said engine afterwards with such faulty selected and installed inventive exhaust valve will malfunction, possibly to a degree that access to some "restricted pollution" coastal or harbor zones may be denied for the vessel which is propelled by the malfunctioning engine. Therefore, and due to the possibly large amount of details required to fully document an inventive exhaust valve, such valve preferably is made easily identifiable by data stored at various occasions to contactlessly be read from at least one tag of said valve, preferably a tag of a RFID-type, comprising stored data to unambiguously define said valve.

Preferably, the valve disc having the cavity designed as the basin for retention of burnt gas is provided with a protection layer on the valve disc's underside. Also preferably, at least one tag is further loaded with data specifying details to authenticate said valve, such authenticating data preferably also comprising manufacturing, (IMO) approval, historic and possible or planned future use-data for said valve.

Preferably, at least one said tag is located within a line section of ¾ of the overall axial valve length opposed to the end at which the valve disc is located. This ensures that at least this tag, normally being an electronic device sensitive to high temperatures, can be given a position shielded from being swept and destroyed by the very hot exhaust gas leaving the combustion chamber, when the exhaust valve is opened. Instead then the tag of said exhaust valve can be exposed for reading by non-contacting means positioned above the combustion room for said exhaust valve.

Normally such reading is performed before or at engine startup to supply parameters or data to the engine's control system, but reading of such a tag by non-contacting means to collect data from the at least one such exhaust valve can also be performed during the functioning of an inventive large sized diesel engine. Hereby a person who could be an inspector from IMO or a ship insurance company, could verify the installed exhaust valve to allow continued function of the engine, the data used for that purpose can possibly be read into the tag at the same time, without having to stop the engine for that purpose.

In the description above preferred embodiments of the invention are explained. But the invention is not restricted to this. The protected scope of the invention is specified in the following claims.

The invention claimed is:
1. A large sized diesel engine, having a combustion room (3) delimited by a reciprocating piston (4), comprising:
   an exhaust valve (13) having a valve disc (15) arranged at a lower end of a valve shaft (14),
   the valve disc (15) including an underside which faces the combustion room (3) and being provided with a basin designed as a rotationally symmetric cavity (18) that is surroundingly bordered and downwardly open,
   wherein for retention of burnt gas, the maximum of rise of a concavely shaped underside of the valve disc (15) relative to an imaginary planar face (23) directly supporting the valve disc (15), is within the range of 2-10% of the outer diameter of the valve disc (15),
   at least one said tag being located with a line section of ¾ of the overall axial valve length opposed to the valve disc end,
   the tag of said exhaust valve being exposed for reading by non-contacting means positioned above the combustion room for said exhaust valve, and a combustion room volume formed by the cavity (18) on the underside of the valve disc (15) being compensated by raising a top face level of the piston (4) with a shims layer (24).

2. A large sized two stroke diesel engine according to claim 1, wherein the shims layer (24) is provided between two supporting areas assigned to the piston (4), for compensating elevation of the piston top face.

3. A large sized two stroke diesel engine according to claim 1, having a crosshead (5), a pin (7) of which is connected with the piston (4) via a piston rod (6) supported on the crosshead (5) construction, wherein the shims layer (24) is inserted between the crosshead pin (7) and the piston rod (6).

4. A large sized diesel engine according to claim 1, wherein the volume of the cavity (18) on the underside of the valve disc (15) is within the range of 0.5-3.0% of the volume of the combustion room (3) when the exhaust valve is in closing position and the piston (4) has reached the top dead center.

5. A large sized diesel engine according to claim 4, wherein the volume of the cavity (18) on the underside of the valve disc (15) is within the range of 1-2% of the volume of the combustion room (3) when the exhaust valve is in closing position and the piston (4) has reached the top dead center.

6. A large sized diesel engine according to claim 5, wherein the volume of the cavity (18) in the underside of the valve disc (15) is within the range of 1.6%-1.7% of the volume of the combustion room (3) when the exhaust valve is in closing position and the piston (4) has reached the top dead center.

7. The large sized diesel engine according to claim 1, wherein the maximum of rise of the concavely shaped underside of the valve disc (15) relative to an imaginary planar face (23) directly supporting the valve disc (15) is within the range of 5-7% of the outer diameter of the valve disc (15).

8. The large sized diesel engine according to claim 7, wherein the maximum of rise of the concavely shaped underside of the valve disc (15) relative to the imaginary planar face (23) directly supporting the valve disc (15) is within the range of 6-6.5% of the outer diameter of the valve disc (15).

9. The large sized diesel engine according to according to claim 1 or 7, wherein the outer diameter of the valve disc (15) of the exhaust valve (13) is at least 100 mm.

10. The large sized diesel engine according to claim 9, wherein the outer diameter of the valve disc (15) of the exhaust valve (13) is at least 160 mm.

11. A process for reduction of $NO_x$-formation in a two stroke large sized diesel engine (1) having:
- at least one combustion room (3) with an exhaust opening (12) coaxially arranged within and controlled by an exhaust valve (13) having a valve disc (15) arranged at a lower end of a valve shaft (14),
- whereby the valve disc (15) includes an underside which faces a combustion room (3) and is provided with a basin designed as a rotationally symmetric cavity (18), being surroundingly bordered and being downwardly open,
- whereby for retention of burnt gas, the maximum of rise of a concavely shaped underside of the valve disc (15) relative to an imaginary planar face (23) directly supporting the valve disc (15), is within the range of 2-10% of the outer diameter of the valve disc (15), the process comprising:
- carrying out, in the combustion room (3) at each work cycle, a fuel injection, a combustion of fuel, an ejection of burnt gas, a scavenging and filling with fresh air, and a compression of the filling of the combustion room (3),
- further comprising adding some burnt gas to the air before combustion in such a way that at least some of the burnt gas added to the air is conserved in the combustion room (3) in the manner of a nest (19) of burnt gas built within a rim area of the underside of the said exhaust valve (13) being concavely shaped on the underside.

12. A process according to claim 11, wherein the fresh air fed to the combustion room (3) is rotated around a central axis.

13. A process according to claim 12, wherein the exhaust valve (3) is rotated around its axis, during a time when not being in a fully closed position.

14. A process according to claim 11 or 12, wherein at fuel injection, the fuel at least partly is injected from outward of the nest (19) into the nest (19) of burnt gas built on the underside of the exhaust valve (3).

15. A process according to claim 11 or 12, wherein an amount of the fuel is injected into the fresh air.

* * * * *